United States Patent [19]

Ono et al.

[11] 4,197,325
[45] Apr. 8, 1980

[54] CARBON DIOXIDE CONTAINING JELLY AND PROCESS FOR PREPARING THE SAME

[75] Inventors: Hokoto Ono, Kawagoe; Yoichi Akino, Tokyo, both of Japan

[73] Assignee: Taiyo Fishery Co., Ltd., Tokyo, Japan

[21] Appl. No.: 912,295

[22] Filed: Jun. 2, 1978

[30] Foreign Application Priority Data

Oct. 5, 1977 [JP] Japan ................................ 52-118971

[51] Int. Cl.$^2$ ................................................ A23L 1/06
[52] U.S. Cl. .................................... 426/397; 426/573; 426/576; 426/477
[58] Field of Search ............... 426/573, 575, 576, 577, 426/477, 393

[56] References Cited

U.S. PATENT DOCUMENTS

| | | | |
|---|---|---|---|
| 2,541,731 | 2/1931 | Walker | 426/576 |
| 2,778,737 | 1/1957 | Du Bridge | 426/577 |
| 3,483,002 | 12/1969 | Stein | 426/573 |
| 3,658,556 | 4/1972 | Klein | 426/573 |
| 3,761,285 | 9/1973 | Nagasawa et al. | 426/393 |
| 3,845,231 | 10/1974 | Nagasawa et al. | 426/393 |

*Primary Examiner*—Jeanette M. Hunter
*Attorney, Agent, or Firm*—Fleit & Jacobson

[57] ABSTRACT

Disclosed is a carbonated jelly which is prepared by hermetically charging gelatin or high-molecular polysaccharide capable of forming a jelly with a sweetener, an organic acid, water or fruit juice and other ingredient along with carbon dioxide into a receptacle, heating the resulting product to form a sol containing carbon dioxide and cooling the sol thus obtained.

7 Claims, No Drawings

CARBON DIOXIDE CONTAINING JELLY AND PROCESS FOR PREPARING THE SAME

BACKGROUND OF THE INVENTION

The present invention relates to carbon dioxide containing jelly foodstuffs and the process for preparing the same.

It is generally known that gelatine, carragheenan or the like can be dissolved in water by heating to thereby form a sol, which gels upon cooling and is then solidified. It is also known that by taking advantage of this property a very delicious jelly can be made.

However, carbon dioxide has so far not been incorporated into this jelly regardless of whether it is prepared on a domestic or industrial scale, although coffee, fruit juice, fruit wine and fruit nectar in addition to sweeteners and acids have been added to the jelly according to one's preference. There are two reasons: one residing in the fact that, in order to obtain the jelly, the gelatine must be heated after being suspended in water to form a sol, and the other in the fact that although the incorporation of carbon dioxide must be carried out in a sol state, it is extremely difficult to dissolve the carbon dioxide in water in the range of temperatures at which the sol state is maintained.

In the range of temperatures between which the gelatine is dissolved in hot water and coagulates upon cooling the solubility of carbon dioxide relative to water is about 0.1% by weight at 35° C. and about 0.2% by weight at 10° C. Consequently, even though the gas is dissolved in the gelatine by absorption at this stage, the jelly obtained upon solidification due to cooling does not possibly reach a state exhibiting a refreshing quality due to carbon dioxide.

In fact, although it is possible to prepare jelly by pouring cold soda drink into a hot gelatine solution when the solution reaches a temperature just before it coagulates, i.e. about 10° C., then gradual cooling and agitating moderately followed by further cooling, the obtained jelly virtually does not possess a refreshing quality and merely produces a so-called "vapid" lemonade jelly.

The gelling points of gelatine and the like vary according to their kind, quality and concentration under the influences of sugar and other additives added thereto.

|  | Concentration (%) | Concentration of Sugar (%) | Gelling Point (%) |
|---|---|---|---|
| Gelatine | 2.0 | 16.4 | 4–8 |
| Gelatine | 6.0 | 0 | 14–18 |
| Gelatine | 10.0 | 0 | 18–21 |
| Agar | 1.5 | 16.0 | 36 |
| Carragheenan | 1.5 | 15.0 | 33 |

SUMMARY OF THE INVENTION

The foodstuffs according to the present invention are obtained by a process based on an unique combination of ingredients dissolved in water under a novel idea. More particularly, the present invention relates to the carbon dioxide containing jelly having appetizing and refreshing qualities.

DETAILS AND DESCRIPTION OF THE INVENTION

The present invention is illustrated in more detail as follows:

In order to prepare the foodstuffs according to the present invention 5.3 g of edible gelatine, 44 g of sugar and 0.75 g of citric acid are charged along with flavoring and coloring if desired into a can suitable for carbonated drink. 53 ml of water is also added to the can. These ingredients are mixed together and are made to hydrate and swell sufficiently. Thereafter, the ingredients are dissolved by heating them to about 50° C. by means of a hot water bath. The resulting solution is appropriately solidified by cooling it to 5°–10° C. 156 ml of carbonated water having a gas volume (hereinafter referred simply to as Vol) of about 3.2, which is previously prepared by a carbonator, is poured into the resulting product at 7°–10° C. by means of a filler for carbonated drink. Thereafter, the can is seamed immediately. The can is immersed in hot water of 50°–70° C. for 10–20 min., while rotating and shaking the can if desired, to thereby change its contents to a homogeneous solution. After the heating, the resulting solution is sufficiently maintained at about 4°–10° C. by cooling it with water. The jelly thus obtained contains carbon dioxide of about 2 Vol.

In addition to the essential part of the process of the present invention as mentioned above, complementary explanation is given below:

I. The receptacle used should be of inner pressure resistance.

As a pressure resistant receptacle, use is generally made of a can for carbonated drink or beer can or pressure bin. However, because of their quality they have some limits for practical reasons as they are.

A general-purpose can or taper can does not possess sufficient inner pressure resistance. In any case the can or bottle used as the receptacle should have a strength sufficient to withstand high pressures generated at the time when the carbon dioxide of 2.2–5.0 Vol is heated to 70°–75° C. and to 85° C. in special cases. For example when the carbonated jelly is prepared using of a normal No. 6 can (Japanese Agriculture & Forestry Standard), the top and bottom of the can begin to swell out just after the can is seamed. In case of 2.5–3 Vol if the can is then immersed in warm water of 42°–45° C. for 3–7 min. The top and bottom of the can begins to protrude under the pressure. Although, in the case of about 2 Vol, the top and bottom of the can do not appreciably swell out nor any buckling from them in 60° C., a refreshing quality is not obtained depending upon the material filled in the can.

On the other hand, a taper can containing carbon dioxide of 3 Vol is punctured at 20°–25° C. If the can having 2–2.2 Vol is immersed only in warm water of 35°–37° C. its bottom swells out excessively. Further, buckling excessively from the seamed portion of the can. Thus, this type of can is unsuitable for use in this application.

As mentioned above, special attention must be given to the inner pressure resistance of the receptacle used for treating the product of the present invention.

II The above mentioned process is a variation of a so-called "pre-syrup" process, i.e. a process in which carbonated water is added to a mixed solution. The jelly composed only of gelatine may be added to an aqueous solution of the other additives and carbonated water.

Alternatively, a pre-mix process in which a carbon dioxide is added to the mixed solution may be used at the later stage. In addition, use may be made of a pre-mix process in which all the ingredients including gelatine are converted to a suspension as homogeneous as possible and then the suspension subjected to carbonation.

In comparison with the pre-syrup process, the pre-mix process renders it possible to make a considerable reduction in the gas volume of the liquid being added and hence it is best suited for the preparation of the product containing a higher volume of carbon dioxide.

Another possible process may be adopted, which comprises adding an organic acid in a calculated quantity instead of carbon dioxide to form jelly and pouring a required amount of sodium bicarbonate to the jelly.

III The quantity of gelatine may be varied between 1.8 and 2.5% by weight according to one's preference. Preferably, the quantity of agar is 1.2-2% by weight and that of carragheenan is 0.5-1.5% by weight. These ingredients may be used in combination.

These ingredients are hermetically charged in the receptacle and dissolved uniformly by heating. In this case, the heating temperature may be 40°-50° C. in the case of gelatine and 60°-70° C. in the case of carragheenan. However, agar must be heated to 80°-85° C. and possibly as high as 90° C. because of its higher melting point; hence, special care must be given to the heating method.

IV According to the present invention, flavouring and coloring matters such as oranges, straw-berries and so on may be added optionally depending upon one's preference. Fruit juice may be used as is; however, the moisture, sugar and acid content must be regulated in this case. In general, however, it should be noted that the fruit juice is apt to impair the transparency and consistency of the jelly. The same process may adopted when fruit wine, pulp extract, fruit nectar milk drink and other additives are used in place of the fruit juice.

The results of panel tests for products prepared according to the present invention are given below:

In order to check the products having different gas volumes for the degree and intensity of a refreshing quality which varies depending upon the quantity of carbon dioxide contained therein, the panel tests were carried out using the nulti-comparison test method according to "the organoleptic estimation method" (Food Industry, 5-second volume, 1977, P 44-58) suggested by Elizabeth Larmond.

Five test samples having different gas volumes were compared against standard control sample. All samples were cooled in advance to 5° C. for testing. The panelists were requested to check the samples for the presence and intensity of a refreshing quality. (As the standard sample, use was made of a product having 1.0 Vol and hence a poor refreshing quality. The panelists were not informed of the concentration.) Samples were rated on a hedonic scale of 1 to 9 as follows: grade 1 designates "the most favorable refreshing quality", grade 9 "the most unfavorable refreshing quality" and grade 5 "the moderate refreshing quality equal substantially to that of the standard sample". On the basis of these grades, an analysis of variance was obtained.

(A) Orange Jelly

Gas Volumes of Samples: 1.0, 1.4, 2.0, 2.4, 2.9
Number of Panelists: 14

TABLE 1

| Gas Volume (product) | 1.0 | 1.4 | 2.0 | 2.4 | 2.9 | Total |
|---|---|---|---|---|---|---|
| Panel | | | | | | |
| 1 | 7 | 3 | 6 | 5 | 1 | 22 |
| 2 | 5 | 5 | 2 | 2 | 3 | 17 |
| 3 | 1 | 5 | 2 | 1 | 5 | 14 |
| 4 | 9 | 9 | 1 | 5 | 4 | 28 |
| 5 | 6 | 2 | 4 | 3 | 1 | 16 |
| 6 | 9 | 6 | 5 | 7 | 7 | 34 |
| 7 | 7 | 3 | 2 | 5 | 4 | 21 |
| 8 | 6 | 7 | 5 | 3 | 4 | 25 |
| 9 | 2 | 3 | 1 | 4 | 3 | 13 |
| 10 | 1 | 7 | 7 | 1 | 4 | 20 |
| 11 | 2 | 7 | 3 | 6 | 1 | 19 |
| 12 | 4 | 4 | 2 | 2 | 5 | 17 |
| 13 | 5 | 1 | 1 | 1 | 1 | 9 |
| 14 | 9 | 9 | 6 | 1 | 2 | 27 |
| Total | 73 | 71 | 47 | 46 | 45 | 282 |

The results of the analysis of variance bases on Table 1 are given in the following table:

| Source of Variation | Degree of Freedom (df) | Sum of Squares (SS) | Mean Square (MS) | Variance Ratio (F) |
|---|---|---|---|---|
| Sample | 4 | 58.23 | 14.56 | 3.26* |
| Panelists | 13 | 115.95 | 8.92 | 1.99* |
| Error | 52 | 231.77 | 4.46 | |
| Total | 69 | 405.95 | | |

The "samples" regarded as significant at the 5% level as a result of the aforesaid tests were carried out according to the multi-range test method of Duncan. The results showed that (1.0, 1.4) and (2.0, 2.4, 2.9) are regarded as significant, while the ranges between 1.0 and 1.4 and that between 2.0, 2.4 and 2.9 is regarded as insignificant.

In the case of the orange flavored product, it appears that a refreshing quality is obtained if carbon dioxide gas is present in a gas volume of more than about 2.0 Vol. At a gas volume of about 1.5 Vol, the refreshing quality is not appreciably obtained. In a range of 2.0-3.0 Vol, no distinct tendency toward the refreshing quality is found.

(B) Coke (Coca Cola) Jelly

The panel tests were carried out for the coke jellies prepared according to Example 3, to be described later, in the same manner as in the case of the orange and under the following conditions:

Gas Volumes of Samples: 1.0, 1.5, 2.2, 2.7, 3.2
Number of Panelists: 12

TABLE 2

| Gas Volume (product) | 1.0 | 1.5 | 2.2 | 2.7 | 3.2 | Total |
|---|---|---|---|---|---|---|
| Panel | | | | | | |
| 1 | 6 | 4 | 3 | 1 | 6 | 20 |
| 2 | 6 | 3 | 5 | 3 | 4 | 21 |
| 3 | 6 | 4 | 2 | 1 | 1 | 14 |
| 4 | 8 | 6 | 4 | 4 | 6 | 28 |
| 5 | 8 | 8 | 6 | 4 | 4 | 30 |
| 6 | 4 | 4 | 3 | 3 | 3 | 17 |
| 7 | 3 | 4 | 4 | 4 | 2 | 17 |
| 8 | 2 | 2 | 2 | 2 | 3 | 11 |
| 9 | 3 | 5 | 4 | 4 | 3 | 19 |
| 10 | 2 | 4 | 4 | 4 | 2 | 16 |
| 11 | 5 | 5 | 6 | 3 | 1 | 20 |
| 12 | 9 | 9 | 6 | 1 | 1 | 26 |

TABLE 2-continued

| Gas Volume (product) | 1.0 | 1.5 | 2.2 | 2.7 | 3.2 | Total |
|---|---|---|---|---|---|---|
| Total | 62 | 58 | 49 | 34 | 36 | 239 |

The results of the analysis of variance based on Table 2 are given in the following table:

| Source of Variation | Degree of Freedom (df) | Sum of Squares (SS) | Mean Square (MS) | Variance Ratio (F) |
|---|---|---|---|---|
| Sample | 4 | 53.07 | 13.26 | 5.24* |
| Panelists | 11 | 70.59 | 6.41 | 2.53* |
| Error | 44 | 111.33 | 2.53 | |
| Total | 59 | 234.99 | | |

From the above table, it is evident that the "sample" are regarded as significant at the 5% level.

As in the case of the orange, the samples were tested according to the multi-range test method. The results showed that (1.0, 1.5) and (2.7, 3.2) are regarded as significantly different while the ranges, 1.0–1.5–2.2, 2.2–2.7 and 2.7–3.2 regarded as not significantly different.

2.2 was not regarded as significantly different even when comparisons were made at both higher and lower concentrations.

Another comparison test for the products of Example 3 showed that the product having 2.0 Vol possesses a distinctly poor refreshing quality as compared with the products having 2.7 and 3.4 Vol. From this fact, it appears that carbon dioxide having a gas volume of about 2.2 to more than 2.5 is necessary for giving a refreshing quality to the coke jellies.

From the results of the panel tests for the products (A) and (B) as mentioned above, it is concluded that the gas volume must normally be more than 1.8 Vol, having an upper limit of about 4.0 Vol for practical and handling reasons, this taking into consideration the fact that the refreshing property of the jelly product drops with an increase in temperature after removal from the container before eating.

As explained in detail in the foregoing description, the process according to the present invention makes it possible to prepare a carbon dioxide containing jelly not attainable until now.

While the present invention is explained by way of the following examples, the scope of the present invention is not limited to the numerical value therein.

EXAMPLE 1

13.5 g of a powdery mixture of 10 parts of gelatine, 87 parts of sugar, 1.5 parts of citric acid and small quantities of orange flavor and natural coloring was charged into a specific taper can of 75 ml in volume. To the mixture was added 9 ml of water. The resulting product is made to hydrate and swell under agitation, and was then heated to about 50° C. to dissolve these ingredients. The resulting solution was solidified by cooling it to about 10° C. in water. 48 ml of carbonated water at 8° C. and 3.2 Vol was poured into the can, which was then seamed.

In a similar manner, carbonated water of 3.8 Vol and also of 4.5 Vol was filled in another cans. These cans were seamed. The cans thus seamed were heated under rotation to 70° C. for 20 min. to obtain gelation.

The gas volume of the product thus obtained correspond to 2.0 Vol, 2.4 Vol, and 2.9 Vol, respectively. As a result of the panel tests, the products were found to have virtually the same intensity of carbon dioxide and possess a good refreshing quality.

EXAMPLE 2

2.4 kg of gelatine and 0.24 kg of carragheenan were suspended in 22.4 l of water and made to hydrate and swell in water. The suspension was then heated to 60° C. to dissolve the ingredients. 30 ml of the obtained solution was poured into each specific pressure resistant taper cans each having a volume of 150 ml. The cans were then seamed and cooled to obtain gelation.

Apart from this, 10 l of plum liqueur (B 32, specific gravity 1.233) and 16 kg of sugar were agitated together with 65 l of water in a tank to dissolve these ingredients. With the use of a carbonator, a solution of 8°–10° C. and 2.8 Vol was prepared. 105 ml of this solution was poured in each of the cans containing the jelly.

After filling about 250 ml cans in this manner, repeating the process a solution of 3.6 Vol and also of 4.3 Vol was poured in the remaining cans. All the cans were seamed and heated under rotation to 70° C. for 20 min, and were then cooled to obtain carbonated plum liqueur jelly.

The gas volumes of the obtained jelly correspond to 2.0 Vol, 2.5 Vol, and 3.0 Vol. All the jelly samples were found to have the aroma characteristics of plum liqueur and possess a refreshing quality as well as a good taste.

EXAMPLE 3

A solution of 1 kg sugar and 4 l coke syrup (1:5 concentration) was mixed with 16.5 l of 7°–8° C. water by agitation. This solution was then added under agitation at 7°–8° C. to a previously prepared suspension of 600 g of 18 mesh gelatine and 3.4 l of 7°–8° C. water to form a homogeneous suspension. The suspension was regulated to 2.0 Vol at 7° C. by carbonation. Thereafter, 206 ml of this suspension was poured in each of twenty 250 ml cans. These cans were seamed. An equal portion of the suspension regulated to 2.7 Vol was poured in each of an additional 20 cans and the preceeding steps were repeated. Finally, equal portions of the suspension regulated to 3.4 Vol was poured in each of another group of twenty cans and processed as above.

All these cans seamed were heated and cooled according to the former Examples to obtain carbon dioxide containing cola jelly of 2.0 Vol, 2.7 Vol and 3.4 Vol. Some cans were opened to taste the obtained jelly. As a result, the jelly containing 2.0 Vol was found to have a poor refreshing quality (regarded as significantly at the 1% level) as compared with other jelly products. Thus, it appears the the concentration of carbon dioxide providing a refreshing quality in coke type product is different than in the case of the orange jelly.

What is claimed is:

1. Gelled carbonated foodstuffs comprising as starting materials from about 0.5 to 2.5 parts by weight of at least one of edible gelatine or a high molecular polysaccharide capable of forming jelly alone or in combination, less than about 25 parts by weight of sweeteners, less than about 0.5 parts by weight of at least one of an organic acid and its salt, from about 72 to 99 parts by weight of a liquid selected from the group consisting of water, fruit juice, fruit wine, fruit nectar, milk drink, coffee, cola and the like and mixtures thereof, wherein carbon dioxide is present in an amount of from about 1.8 to 4 times the volume of the starting materials.

2. Process for preparing a canned carbonated gel comprising the steps of preparing a gelatine gel by placing in a receptacle starting materials comprising, in weight % based on the content of the final product, less than about 25% of at least one sweetener, from about 1.7 to 2.2% of gelatine, about 0.25% of at least one of an organic acid and its salts and from about 10 to 18% of a liquid selected from the group consisting of water, fruit juice, fruit wine, fruit nectar, milk drink, coffee, cola and the like, allowing the gelatine to swell sufficiently, heating the receptacle to 40°–90° C. by means of a hot water bath to dissolve the contents thereof, and cooling to 5°–10° C. to obtain an appropriately solidified product in the receptacle; pouring carbonated water by pouring at 7°–10° C. in the receptacle the carbonated water having a gas volume predetermined in such a manner that the final product has a gas volume for a filler for carbonated drink; immediately seaming the receptacle by capping; finishing of the carbonated gel by immersing the receptacle thus capped in hot water maintained at 50°–90° C. for 10–20 min.; finally cooling the receptacle with water; and sufficiently maintaining the receptacle at 4°–10° C. to solidify the content thereof as an uniform carbonated gel.

3. The process of claim 2, wherein the final product has a gas volume of from about 1.8 to 4 times the volume of the starting materials.

4. The process of claim 2, wherein the step of preparing the gelatine gel is effected with the use of gelatine and water alone, and wherein the step of pouring the carbonated water is performed by first subjecting to carbonation an aqueous solution of all the ingredients necessary for the preparation of said gelatine gel except said gelatine, followed by pouring of the thus obtained carbonated solution.

5. The process of claim 2, wherein all the ingredients necessary for the preparation of said gelatine gel are finely suspended in water followed by carbonation, and the resulting product is poured in a receptacle, immediately followed by seaming.

6. The process of claim 2, wherein said receptacle used has sufficient strength to withstand the pressure generated at the time when the carbon dioxide of 2.2 to 5.0 vol is heated to 70° to 85° C.

7. The process of claim 2, wherein the receptacle is inner pressure resistant.

* * * * *